US009483922B2

(12) United States Patent
Kawamoto

(10) Patent No.: US 9,483,922 B2
(45) Date of Patent: Nov. 1, 2016

(54) SHAKER APPARATUS AND RELATED METHODS OF TRANSMITTING VIBRATIONAL ENERGY TO RECIPIENTS

(71) Applicant: Glenn Kawamoto, Austin, TX (US)

(72) Inventor: Glenn Kawamoto, Austin, TX (US)

( * ) Notice: Subject to any disclaimer, the term of this patent is extended or adjusted under 35 U.S.C. 154(b) by 0 days.

(21) Appl. No.: 14/477,004

(22) Filed: Sep. 4, 2014

(65) Prior Publication Data

US 2016/0071381 A1 Mar. 10, 2016

(51) Int. Cl.

*H04B 3/36* (2006.01)
*G08B 6/00* (2006.01)
*B06B 1/04* (2006.01)
*H04R 9/06* (2006.01)

(52) U.S. Cl.

CPC ................. *G08B 6/00* (2013.01); *B06B 1/045* (2013.01); *H04R 9/066* (2013.01); *H04R 2400/03* (2013.01)

(58) Field of Classification Search

CPC ...... G10H 1/0008; G10H 3/125; H04R 1/10; H04R 2499/11; H04R 2460/13; H04R 2400/03; H04R 9/066; A61M 2021/0022; A61H 2201/5048; G08B 6/00; B60B 1/045
USPC ......................... 340/407.1; 381/56, 151, 388
See application file for complete search history.

(56) References Cited

U.S. PATENT DOCUMENTS 5,101,810 A 4/1992 Skille et al.
5,424,592 A * 6/1995 Bluen et al. ............. A47C 3/02 310/15
5,617,477 A 4/1997 Boyden
5,624,155 A 4/1997 Bluen et al.
5,687,244 A 11/1997 Untersander
6,369,312 B1 * 4/2002 Komatsu .................. G10H 1/00 381/150
6,694,035 B1 2/2004 Teicher et al.
7,418,108 B2 * 8/2008 Oser ........................ A47C 7/72 381/401
8,391,516 B2 3/2013 Fletcher
8,617,089 B2 12/2013 Oser et al.
2006/0174688 A1 * 8/2006 Kang et al. ............. B06B 1/045 73/1.82
2007/0025575 A1 * 2/2007 Oser et al. ............... A47C 7/72 381/333
2009/0007458 A1 * 1/2009 Seiler ....................... A43B 3/00 340/407.1
2009/0010468 A1 1/2009 Oser
2009/0304217 A1 * 12/2009 Thalheimer et al. .... H04R 5/02 381/334
2011/0044486 A1 2/2011 Barkowski
2011/0278962 A1 11/2011 Hong
2013/0107216 A1 5/2013 Haight et al.
2014/0056459 A1 * 2/2014 Oishi et al. ............ H04R 31/00 381/370
2014/0056461 A1 2/2014 Afshar

FOREIGN PATENT DOCUMENTS

WO WO00/02516 1/2000
WO WO2004112428 12/2004

* cited by examiner

*Primary Examiner* — Thomas Mullen
(74) *Attorney, Agent, or Firm* — Buche & Associates, P.C.; John K. Buche; Bryce A. Johnson

(57) ABSTRACT

Disclosed is a shaker element. In a preferred embodiment, the shaker element is provided with an electrical signal so that the shaker element can impart mechanical motions of the music to a listener whereby the listener can "feel" the music.

13 Claims, 10 Drawing Sheets

SHAKER APPARATUS AND RELATED METHODS OF TRANSMITTING VIBRATIONAL ENERGY TO RECIPIENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of Invention

The subject matter of this application is in the field of vibrational shaker elements.

2. Background of the Invention

Music is an art form composed of a collection of sounds and silence. Although sounds are physical waves through air or another medium, sounds that are used for musical purposes are mostly perceived by the sense of hearing instead of the sense of touch or feel. That said, many music listeners desire feeling the component sounds of music because experiencing music through the senses of hearing and touch enables a heightened perception and understanding of the music. For instance, a singer recording lyrics to the music of a song may wish to feel and hear the music so that the singer can be more in tune and time with the recording. In another instance, a dancer or weightlifter may want to feel music so that the feel of the music can guide or otherwise influence the dancer's/weightlifter's body movements. In yet another instance, some listeners of relaxing sounds can achieve a more relaxed state by physical stimulation associated with the physical touch of sounds. Blind or seeing-impaired persons frequently use sounds to get their bearings (e.g., when crossing the street) and deaf people can only enjoy music by feeling.

The feel of music can be achieved with energetic or loud sounds because sounds are physical waves through a medium. However, overly energetic sounds are damaging to a listener's sense of hearing, disruptive to verbal communications, and stress causing. As a result, users may have a limited ability to touch or feel music in everyday situations. Sometimes, loud or overly energetic musical sounds are tolerated so that music can be felt. For instance, some workers and patrons at a bar, night club, or exercise facility might tolerate loud music so that the full music experience can be enjoyed by everyone else in the facility. In view of the foregoing, a need exists for apparatus and related methods for feeling or touching music without the need for overly energetic sound waves that may damage ears. Various apparatus have been devised for imparting the sense of touch to sounds without employing excessively energetic sounds. For instance, U.S. Pat. No. 8,391,516 (circa 2013), U.S. Pat. No. 5,687,244 (circa 1997), and 6694[4]035 (circa 2001) disclose body-worn apparatus that vibrate the wearer in response to an audio signal. Body worn apparatus, while capable of imparting a form of touch to the wearer, cannot touch others with the sounds of music who are not wearing the device. Also, such body worn apparatus must usually be fit to a wearer for optimal feeling of the sounds. Finally, these body worn apparatus cannot provide a sense of direction by physical touch since the apparatus are always at the same position on the body.

Other apparatus are known for imparting the feeling or touch of sounds to a user. These apparatus are usually in the form of mattresses or chairs that impart physical motions caused by sounds to users seated or lying on the apparatus. See, e.g.: U.S. Pub. Pat. App. Nos. 20110044486 (circa 2011) and 20130107216 (circa 2013); U.S. Pat. No. 5,101,810 (circa 1992) and U.S. Pat. No. 8,617,089 (circa 2013); and Pub. App. WO2000002516 (circa 2000). While capable of imparting physical sensations associated with sound, these apparatus are not always suitable because the apparatus restrict the types of movements music listeners can accomplish while simultaneously feeling music. Such apparatus are also not tied to correspond to audio signals. Furthermore, these apparatus cannot provide bearings for traveling listeners.

Another apparatus that is known to impart the feeling or touch of music is a speaker. Specifically, the feel of sound may be experienced via contact with a loudspeaker because a speaker produces sound from vibrations of a diaphragm. Two problems exist for using a speaker to feel sound. First, the vibrating diaphragm uses a majority of the vibrational energy produced by the speaker to push air in to the form of a sound wave. This means that any meaningful touch of sound that results from contact with a speaker is accompanied by loud and damaging energetic sounds from the speaker. Second, speakers are often remotely positioned relative to a user, which is a disadvantage for those desirous of feeling music "in the moment." Thus, a speaker is not an optimal apparatus for imparting the feeling music. Speakers can be unnecessarily damaging to ears because amplitude may be too high to "feel" the energy via sound waves.

In view of the foregoing, a need exists for apparatus and related methods for feeling or touching music unaccompanied by damaging energetic sound waves. A further need exists for apparatus and related methods for feeling music in a manner that does not restrict the listener's movements and in a way that is capable of providing directional bearings for a user.

SUMMARY OF THE INVENTION

Disclosed is a shaker element. In a preferred embodiment, the shaker element is provided an audio signal so that the shaker element can impart vibrations representing the music to a listener whereby the listener can "feel" the music without the overly damaging audible sound energy. In a preferred embodiment, the shaker element comprises: a housing with a flange; a shaker motor defined by a wire coil and a magnet; a distance holder; and a spyder disk. The spyder disk preferably features spokes.

In a preferred mode of operation, the shaker element is coupled to a power source. Suitably, the motor vibrates the magnet by passing an electric current that represents sound through the wire coil. As the magnet vibrates, a spyder disk's spokes flex to transmit the energy of vibration to the housing instead of pushing air in to a sound wave. When the housing is coupled to a structure via the flange, the mechanical energy of vibration is transferred from the housing to the structure.

In one embodiment, the housing may be secured to a structure via the flange so that the mechanical motion of the motor is imparted to the structure. In one application, the shaker element may be secured to the underside of a floor in a recording studio and a recording artist stands over the element so that the artist can feel the music while making a recording. Other applications include dancing or weight lifting over an installed shaker element 1000 that is positioned on the underside of the floor so that the dancing/weight lifting may be accomplished while feeling the sounds. Another application of the shaker element 1000 is that the shaker 1000 may be used by a hearing impaired person to feel rhythm pulses of music. Yet still, the shaker element 1000 may be installed under a cross walk so that a blind person may feel the direction of sound to safely navigate the crosswalk. Finally, the shaker element may be used to create quiet[e] zones in loud music establishments (e.g., a bar, night club, or exercise facility) so that patrons and workers can enjoy the full music experience without being subjected to loud or damaging energetic sounds.

Other objectives may become apparent to one of skill in the art after reading the below disclosure and viewing the associated figures. Also, these and other embodiments will become apparent from the drawings.

BRIEF DESCRIPTION OF THE FIGURES

The manner in which these objectives and other desirable characteristics can be obtained is explained in the following description and attached figures in which.

It is to be noted, however, that the appended figures illustrate only typical embodiments of the disclosed assemblies, and therefore, are not to be considered limiting of their scope, for the disclosed assemblies may admit to other equally effective embodiments that will be appreciated by those reasonably skilled in the relevant arts. Also, figures are not necessarily made to scale.

DETAILED DESCRIPTION OF PREFERRED EMBODIMENTS

Figure 1:
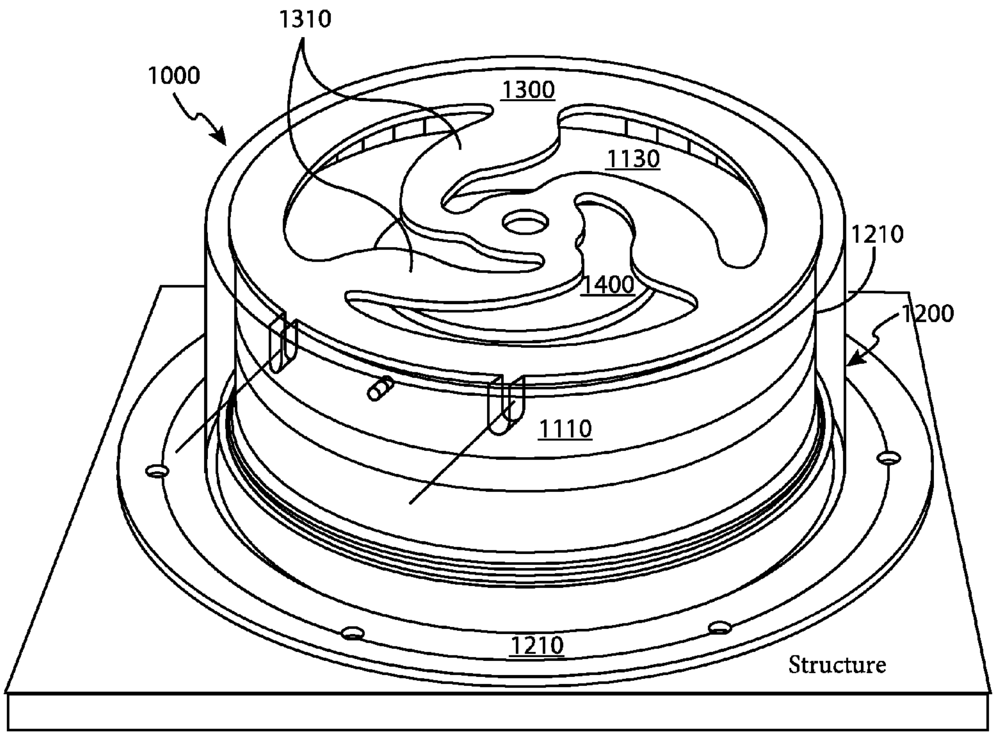
FIG. 1 is a see-through perspective view of a shaker 1000.
Figure 2:
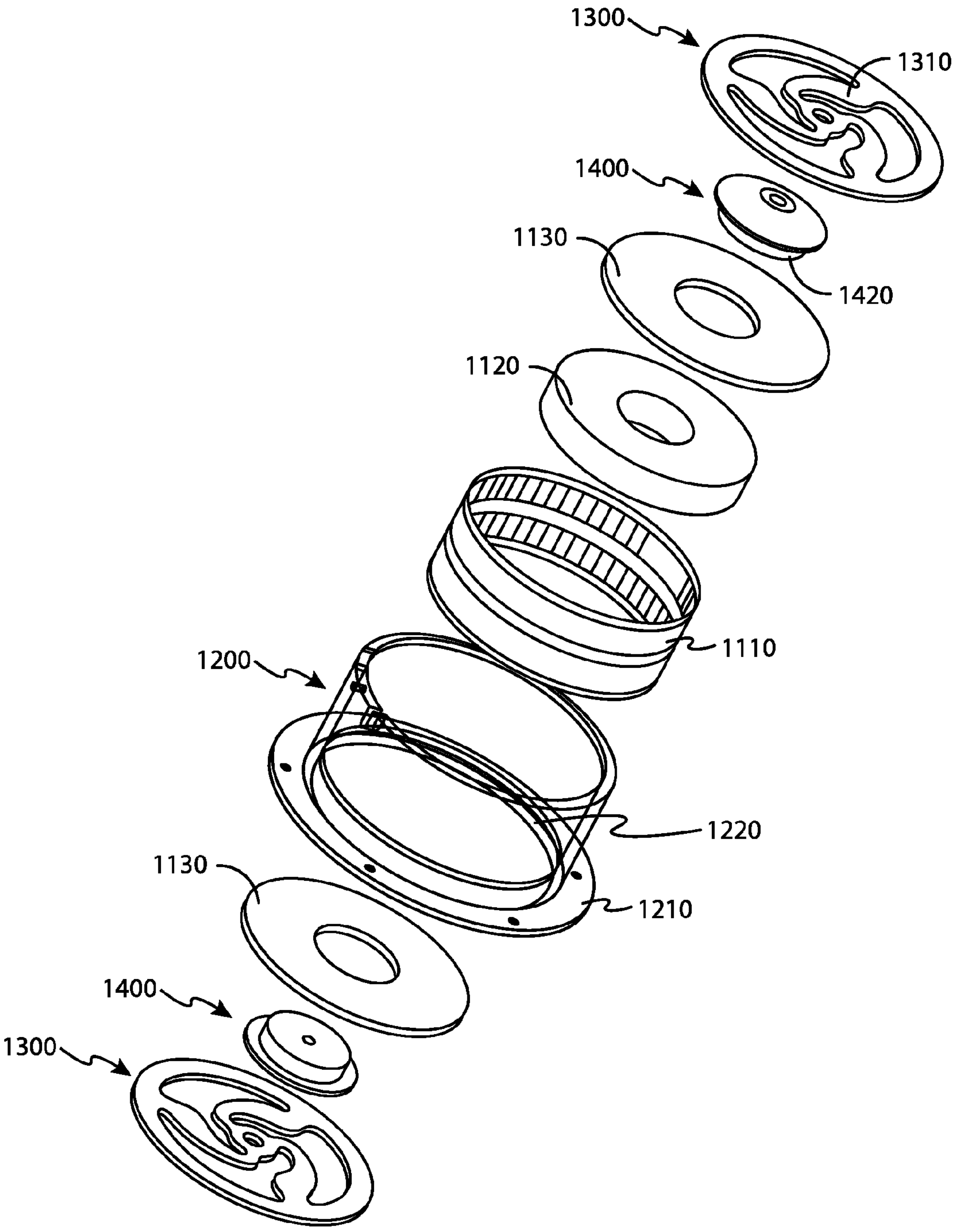
FIG. 2 is an exploded view of the shaker 1000 of FIG. 1.
Figure 3:
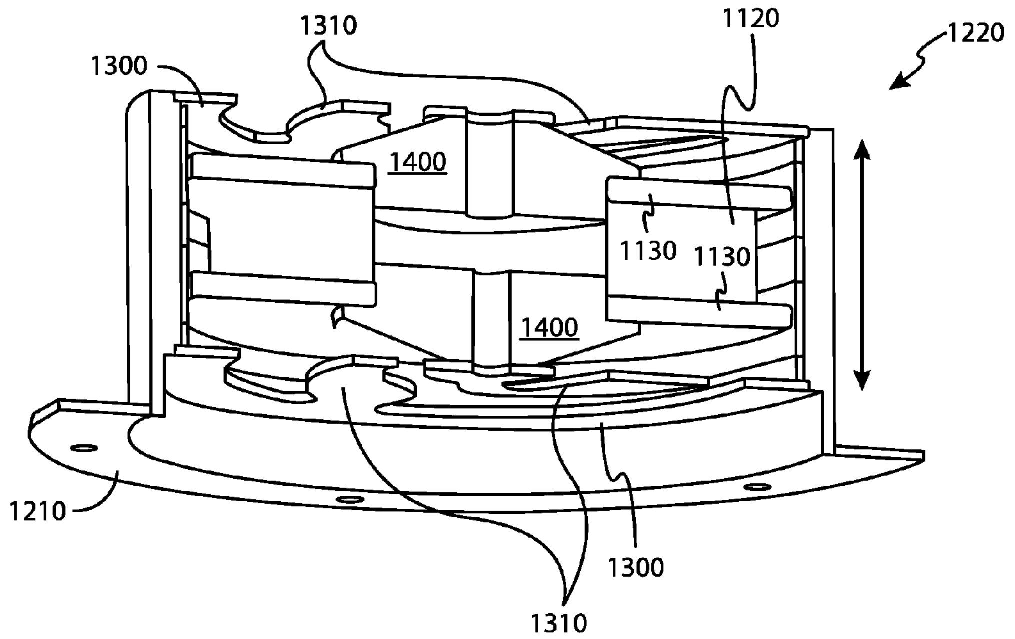
FIG. 3 is a cross section of the shaker 1000 of FIG. 1.

FIG. 1 is a see-through perspective view of a preferred embodiment of a shaker 1000. FIG. 2 is an exploded view of the shaker 1000 shown in FIG. 1. FIG. 3 is a cross section of the shaker 1000 of FIG. 1. As shown in FIGS. 1 through 3, the shaker 1000 comprises: a housing 1200 (shown in FIGS. 1 through 3) that is defined by a flange 1210 and a sidewall 1220; a shaker motor 1100 that is defined by a wire coil 1110 (shown in FIGS. 1 through 3), a magnet 1120 (shown in FIGS. 2 and 3), and two pole plates 1130 (shown in FIGS. 2 and 3) occupying the poles of the magnet 1120 (shown in FIGS. 2 and 3); two distance holders 1400 (shown in FIGS. 2 and 3); and two spyder disks 1300 with three spokes 1310.

In operation, the shaker motor 1100 creates mechanical vibrations of sounds. In a preferred embodiment, the motor 1100 produces vibrations via passing a controlled electric current representing sounds through the wire coil 1110 positioned around the movable magnet 1120. Preferably, the movement of electricity through the coil 1110 produces a magnetic field which creates an attractive or repulsive force against the magnet 1120 so that the magnet 1120 moves within the coil 1110. In a preferred embodiment, the motor 1100 comprises pole plates 1130 positioned at the poles of the magnet 1120 to act as a buffer for ensuring that the magnet 1120 occupies a uniform position within the coil 1110. FIGS. 4 through 9 illustrate the more specific aspects of the shaker motor 1100.

Figure 4:
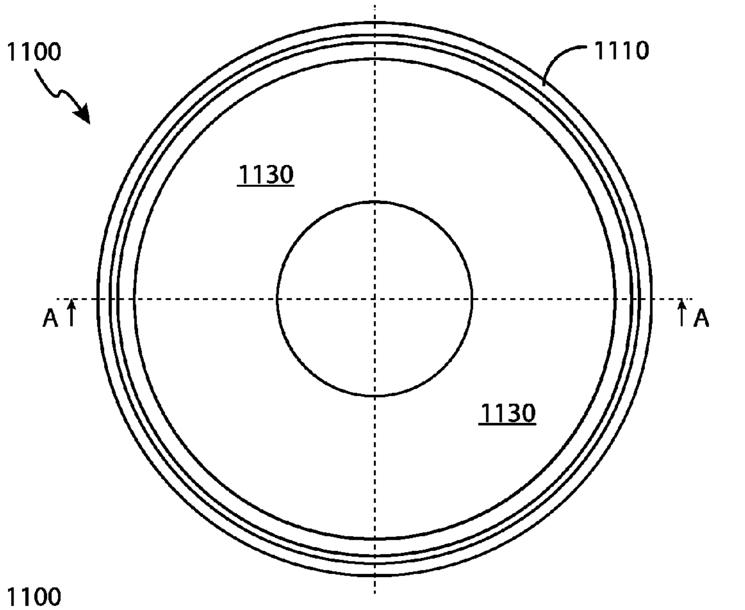
FIG. 4 is a top view of a shaker motor 1100.
Figure 5:
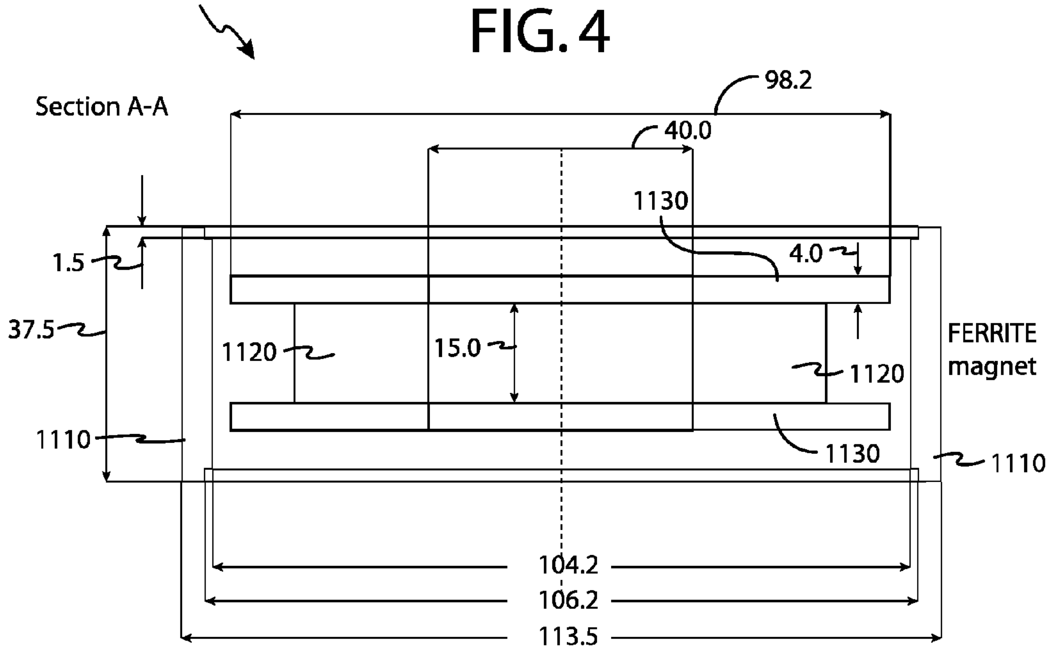
FIG. 5 is a cross section of the shaker motor 1100 of FIG. 4 taken along line A-A of FIG. 4.

FIG. 4 is a top view of the shaker motor 1100. FIG. 5 is a cross section of the shaker motor 1100 taken along line A-A of FIG. 4. As shown in FIGS. 4 and 5, the wire coil 1110, magnet 1120, and pole plates 1130 are all circular/cylindrical. Preferably, the pole plates 1130 coaxially sandwich the magnet 1120 (FIG. 5). In one embodiment, the magnet 1120 is a ferrite magnet. In other embodiments, the magnet may be ceramic or neodymium (and/or other lightweight and rare metal magnets). The sub-assembly of the magnet 1120 and pole plates 1130 is preferably coaxially provided within the coil 1110 so that the magnet 1120 is freely suspended within the coil 1110. In FIGS. 4 and 5, preferred dimensions of the motor 1100 are provided.

Figure 6:
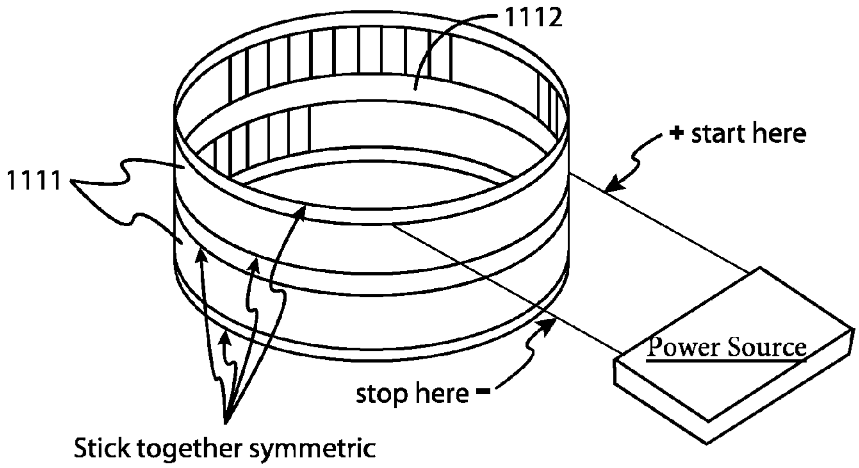
FIG. 6 is a perspective view of a voice coil 1110 of the shaker motor 1100.

FIG. 6 is a perspective view of the wire coil 1110 of the shaker motor 1100. As shown, the coil 1110 is defined by wire 1111 that is wrapped around a cylindrical coil-former 1112 to ensure a circular and cylindrical wire coil 1110. Suitably, the wire 1111 is distributed symmetrically about the coil former 1112. Preferably, the wire 1111 features positive and negative terminals protruding therefrom for electric coupling to a power source that provides electric current representing musical sounds.

Figure 7:
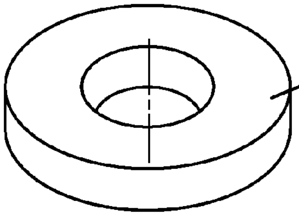
FIG. 7 is a perspective view of a magnet 1120 of the shaker motor 1100.
Figure 9:
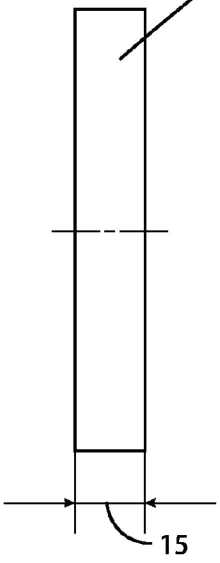
FIG. 9 is a side view of the magnet 1120 of FIG. 7.
Figure 8:
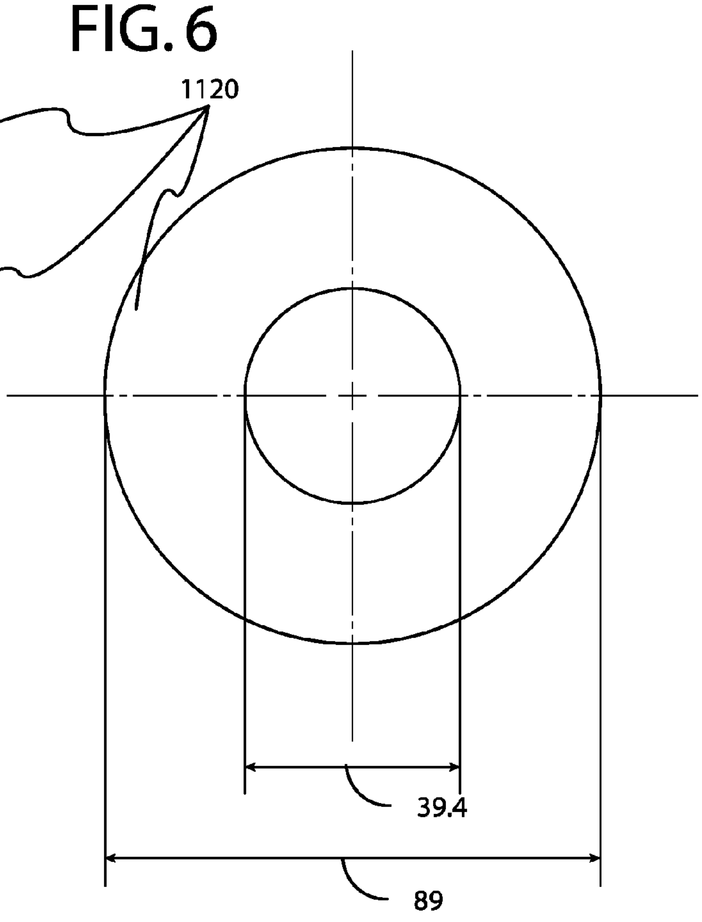
FIG. 8 is a top view of the magnet 1120 of FIG. 7.

FIG. 7 is a perspective view of a magnet 1120 of the shaker motor 1100. FIG. 8 is a top view of the magnet 1120 of FIG. 7. FIG. 9 is a side view of the magnet 1120 of FIG. 7. Referring to FIGS. 7 through 9, the magnet 1200 is cylindrical and features a circular aperture through its center. In a preferable embodiment, the magnet 1120 is a ferrite magnet. In other embodiments, the magnet may be ceramic or neodymium (and/or other lightweight and rare metal magnets). Suitably, the magnet 1120 is configured so that its poles are defined around the top and bottom sides of the cylinder. Suitably, as discussed above, the pole plates 1130 are configured to interface with the poles of the magnet 1120. In FIGS. 8 and 9, preferred dimensions are provided for the magnet 1120.

Figure 10:
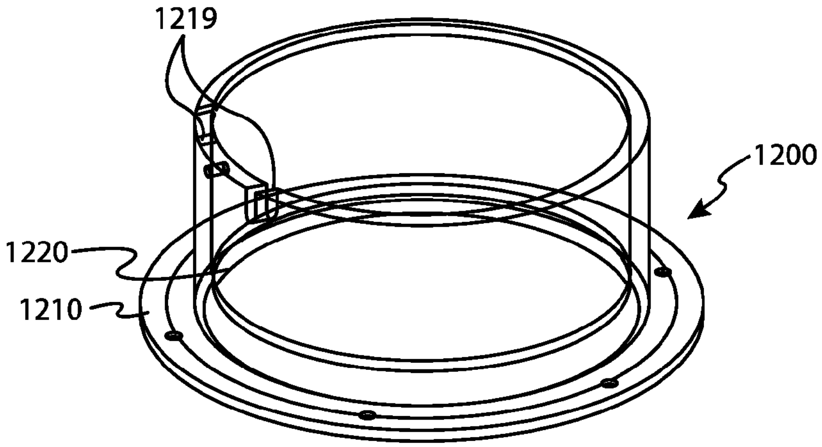
FIG. 10 is a see-through perspective view of the housing 1200 of the shaker 1000.

FIG. 10 is a see-through perspective view of the housing 1200 of the shaker 1000. As shown, the housing 1200 is defined by a tubular sidewall 1220 and a flange 1210 around one end of the sidewall 1220. In use, the flange 1210 is configured with holes so that the housing 1200 may be secured to a structure (e.g., the underside of flooring). In a preferred embodiment, the housing 1200 is constructed of a strong metal (e.g., steel). The more specific details of the flange 1210 and sidewall 1220 are described in connection with FIGS. 11 through 16B.

Figure 11:
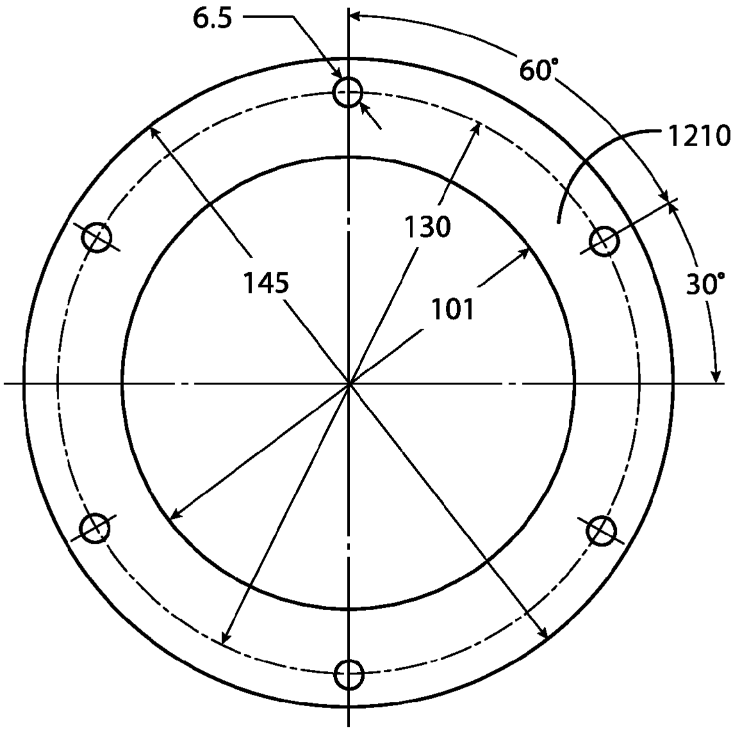
FIG. 11 is a top view of a flange 1210 of the housing of FIG. 10.

FIG. 11 is a top view of a flange 1210 of the housing of FIG. 10. As shown, the flange 1210 is a ring with holes symmetrically positioned around the periphery (e.g., every sixty-degrees). As discussed in greater detail below, the inner diameter of the flange 1210 is configured to retain the sidewall 1220 of the housing. In FIG. 11, preferred dimensions are provided for the flange 210.

Figure 12:
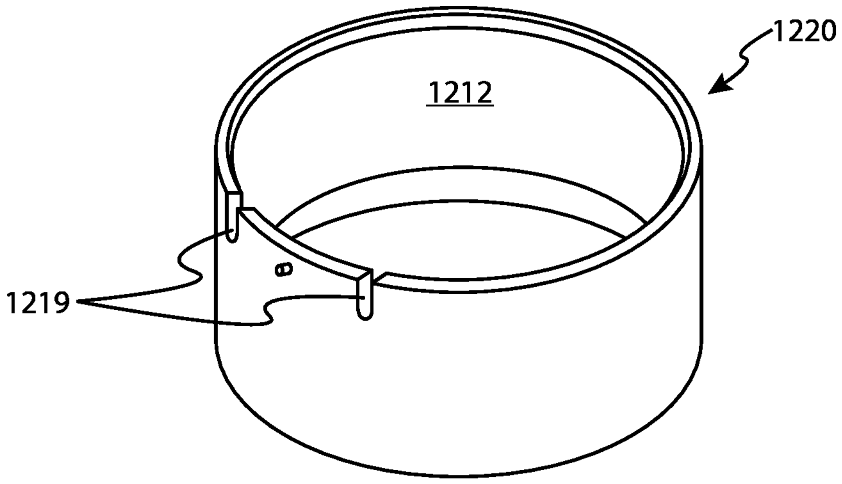
FIG. 12 is a perspective view of the sidewall 1220 of the housing 1200 of FIG. 10.
Figure 13:
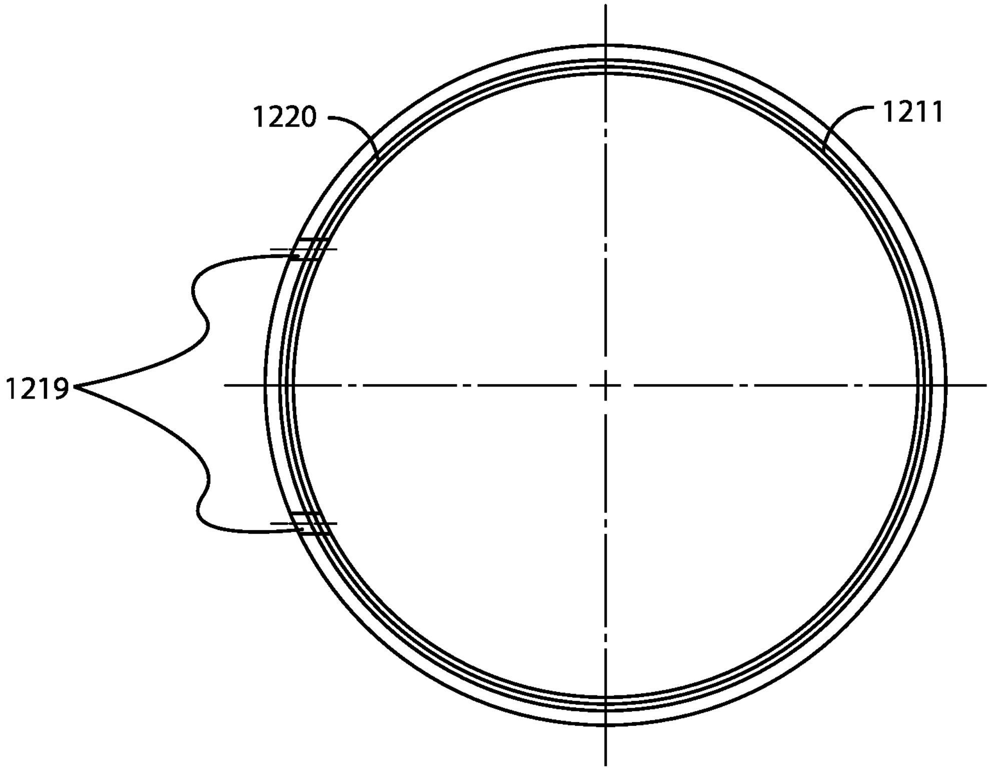
FIG. 13 is a top view of the housing 1220 of FIG. 12.
Figure 14:
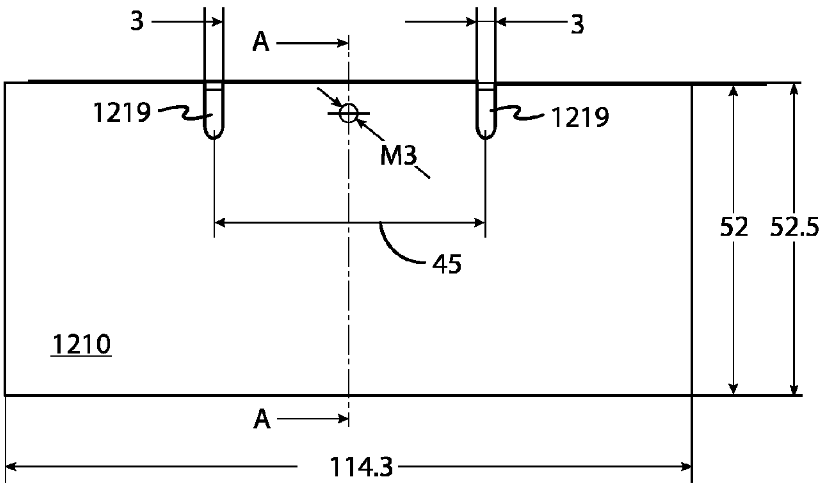
FIG. 14 is a side view of the housing 1220 of FIG. 12.
Figure 15:
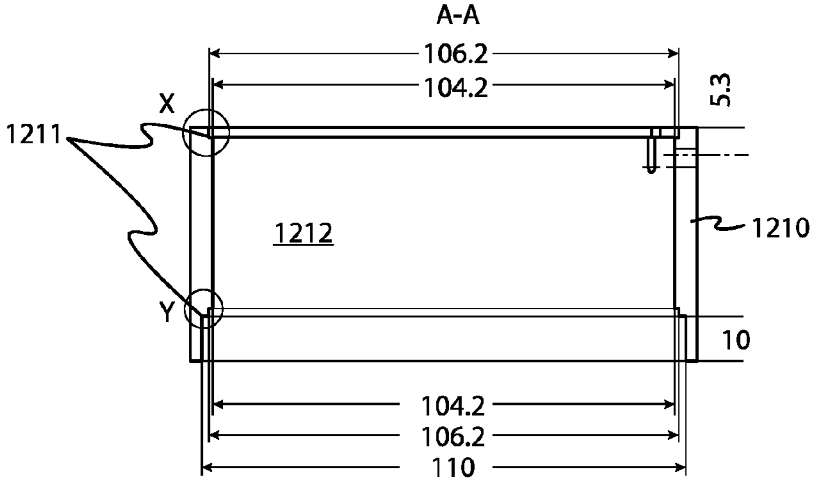
FIG. 15 is a cross-section of the housing of FIG. 12 along line A-A in FIG. 14.
Figure 16A:
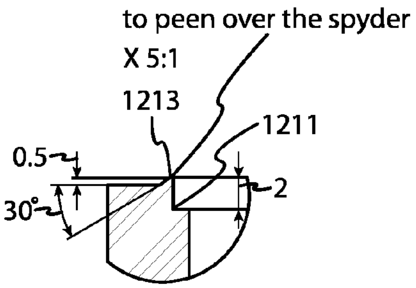
FIG. 16A is a zoom in of the cross section X in FIG. 15.
Figure 16B:
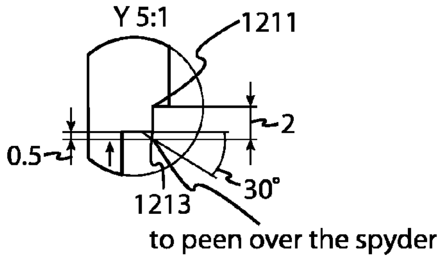
FIG. 16B is a zoom in of the cross section Y in FIG. 14.

FIG. 12 is a perspective view of the sidewall 1220 of the housing 1200 of FIG. 10. FIG. 13 is a top view of the housing 1220 of FIG. 12. FIG. 14 is a side view of the housing 1220 of FIG. 12. FIG. 15 is a cross-section of the housing 1200 of FIG. 12 along line A-A in FIG. 14. As shown, the housing 1200 is preferably cylindrical and configured to retain the shaker motor 1100, the distance holders 1400, and the spyder disks 1300. To this end the housing 1200 features upper and lower ridges 1211 that are each configured, as discussed in greater detail below, to interface with and retain one of the spyder disks 1200. These upper and lower ridges 1211 are shown in greater detail by FIGS. 16A and 16B, which are respectively zoom-in views of the cross section X and Y of FIG. 15. Referring to those figures, the inside corner of the ridges 1211 features excess material 1213 that may be peened over the spyder disk 1300 for retention. Referring back to FIG. 15, the inner wall 1212 of the sidewall 1210 is defined between the upper and lower ridges 1211 and is configured to interface with the wire coil 1110 of the shaker motor 1100. Finally, referring to FIG. 14, the housing sidewall 1210 features cut outs 1219 so that the terminal ends of the wire 1111 may be provided to outside of the housing 1200 (see FIG. 1). FIGS. 14 through 16B show the preferable dimensions of the housing sidewall 1210.

Figure 17:
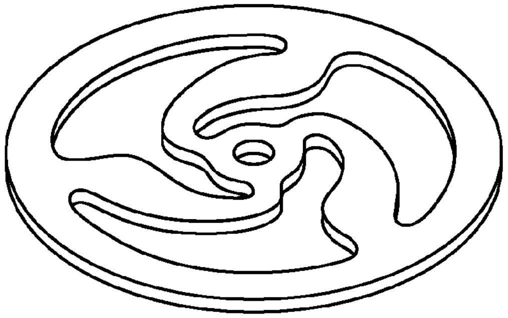
FIG. 17 is a perspective view of a spyder disk 1300.
Figure 18:
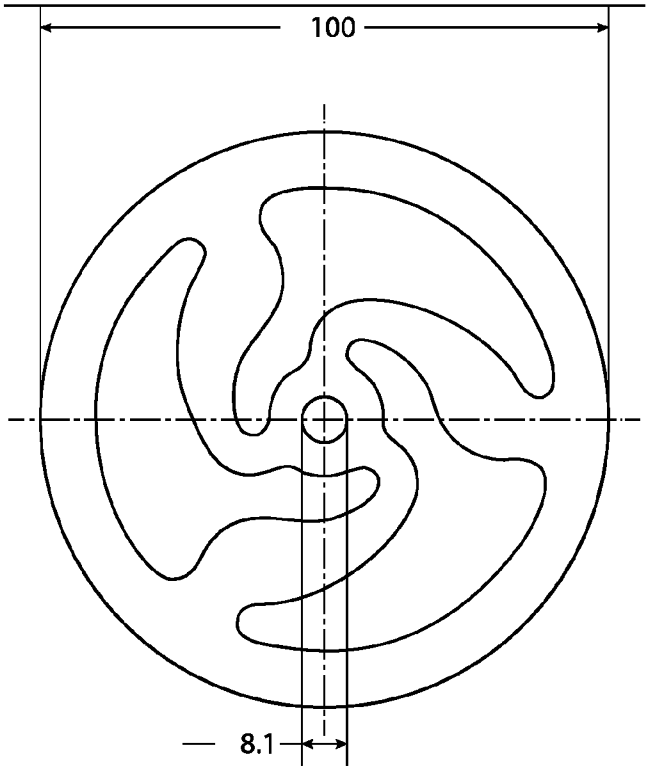
FIG. 18 is a top view of the spyder disk 1300 of FIG. 17.
Figure 19:
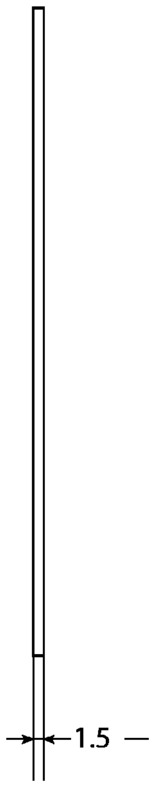
FIG. 19 is a side view of the spyder disk 1300 of FIG. 17.

FIG. 17 is a perspective view of a spyder disk 1300. FIG. 18 is a top view of the spyder disk 1300 of FIG. 17. FIG. 19 is a side view of the spyder disk 1300 of FIG. 17. As shown in FIGS. 17 through 19, the spyder disk 1300 is defined by a ring with spokes 1310 and constructed of fiberglass or other rigid yet flexible material. As discussed above, the spokes 1310 of the spyder disks 1300 are configured to coaxially deflect when the magnet 1120 is vibrated whereby the energy of vibration of the magnet 1120 is ultimately imparted to the housing to the housing 1200. FIGS. 18 and 19 illustrate preferred dimensions for the spyder disks 1300.

Still referring to FIGS. 17 through 19, the spokes 1310 of the spyder disk 1300 operate to transmit vibrational energy from the motor, to the housing, and ultimately to a structure. The spokes 1310 of the spyder disk 1300 are suitably configured so that, when vibrated, energy of their vibration does not push air in to the form of sound waves. In the depicted embodiment, the spokes 1310 are radially spaced so that air may pass through the gaps between the spokes 1310 instead of being pushed in a sound wave. Additionally, the spokes 1310 are preferably configured in a swerve or other preferable style so that any air along the spoke that is pushed or moved, moves in an energy form other than a sound wave.

Figure 20:
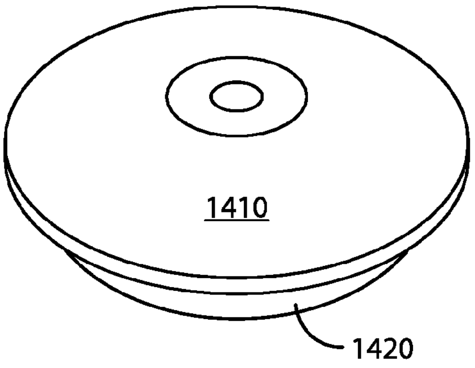
FIG. 20 is a perspective view of a distance holder 1400.
Figure 21:
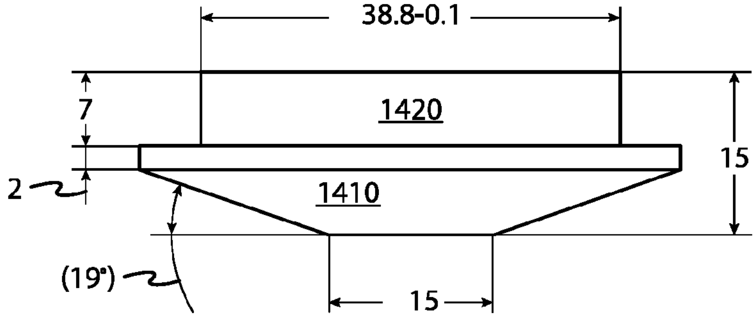
FIG. 21 is a side view of the distance holder 1400 of FIG. 20.
Figure 22:
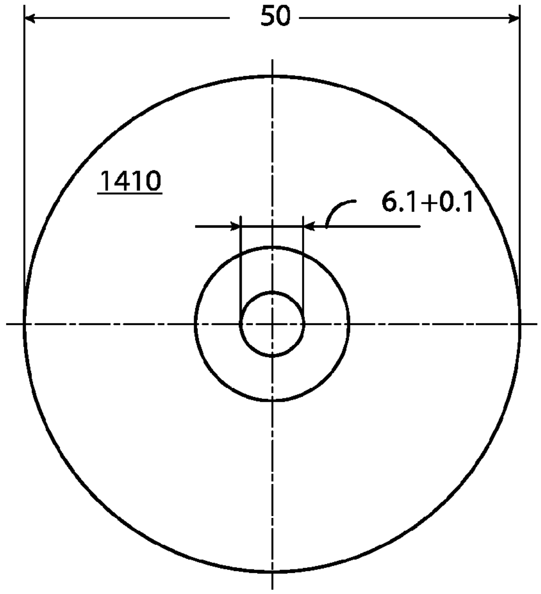
FIG. 22 is a top view of the distance holder 1400 of FIG. 20.

FIG. 20 is a perspective view of a distance holder 1400. FIG. 21 is a side view of the distance holder 1400 of FIG. 20. FIG. 22 is a top view of the distance holder 1400 of FIG. 20. Referring to FIGS. 20 through 22, the distance holder 1400 is defined by a truncated cone 1410 atop a cylindrical plug 1420. Suitably, the top of the truncated cone 1410 is configured to interface with the center of a spyder disk 1300 (as shown in FIG. 3) while the cylindrical plug 1420 is configured for insertion to the pole plates 1130 and the magnet 1120 (as shown in FIG. 3). Suitably, the distance holders 1400 are constructed of aluminum or other light and rigid material. Operably, the distance holders 1400 maintain the magnet 1120 (not shown in FIGS. 20 through 22) in an appropriate position relative to the spyder disks 1300 and the coil 1110. Additionally, the distance holders 1400 impart vibrational energy of the motor 1100 to the spyder disks 1300. Suitably, FIGS. 21 and 22 illustrate the preferred dimensions for the distance holder 1400.

Referring back to FIG. 2, the shaker element 1000 may be constructed by (a) sandwiching the magnet 1120 between the pole plates 1130, the distance holder 1400, and the spyder disks 1300 and (b) placing the sandwiched assembly within the housing 1200. In a preferred embodiment, the terminal ends of the wire coil 1110 may be provided through the housing sidewall 1210 once the sandwiched assembly is positioned within the housing 1200. More specifically, the shaker element 1000 may be constructed by: (1) coaxially positioning the pole plates 1130 on the poles of the magnet 1120; (2) interfacing the wire coil 1110 and the inside wall 1212 (see FIG. 15) of the housing 1200; (3) inserting the cylindrical plugs 1420 of the distance holder 1400 into the center of the pole plate 1400 and magnet 1120 (see FIG. 5); (4) interfacing the spyder disks 1300 with the truncated cone portion 1410 of the distance holder 1400 (see FIG. 3); (5) interfacing the outside edge of one of the spyder disks 1300 with one of the ridges 1211 (FIG. 16B) of the housing 1200 and the other spyder disk 1300 with the other ridge 1211 (FIG. 16A) of the housing 1200; (6) peening the excess material 1213 (FIGS. 16A and 16B) over the spyder disk 1300 for retention; and, (7) stringing the terminal ends of the wire 1111 (FIG. 6) through the cutouts 1219 of the housing 1200 sidewall 1220 (see FIG. 1). The result is the shaker 1000 of FIG. 1. In an alternate embodiment, the assembly described above may be additionally supported by a nut and screw positioned coaxially through all the components. For use, the shaker element 1000 may be secured to a structure via the holes in the flange 1210 of the housing.

In a preferred mode of operation, terminal ends of the wire coil 1111 (FIG. 6) are coupled to a power source. Suitably, the motor 1100 vibrates the magnet 1120 by passing an electric current that represents sound through the wire coil 1110. As the magnet 1120 vibrates, the spokes 1310 of the spyder disks 1300 deflect and, in the process, transmit the energy of vibration to the housing 1200. When the housing 1200 is coupled to a structure via the flange 1210, the mechanical energy of vibration is transferred from the housing to the structure.

In one embodiment, the housing may be secured to a structure via the flange 1210 so that the mechanical motion of the motor 1100 is imparted to the structure. In one application, the shaker element 1000 is secured to the underside of a floor in a recording studio and a recording artist stands over the element so that the artist can feel the music while making a recording. Other applications include dancing or weight lifting over an installed shaker element 1000 that is positioned on the underside of the floor so that the dancing/weight lifting may be accomplished while feeling the sounds. Another application of the shaker element 1000 is that the shaker 1000 may be used by a hearing impaired person to feel rhythm pulses of music or find directional bearings in dark or light-deficient areas. Yet still, the shaker element 1000 may be installed under a cross walk so that a blind person may feel the direction of sound to safely navigate the crosswalk. Finally, the shaker element may be used to create quiet zones in loud music establishments (e.g., a bar, night club, or exercise facility) so that patrons and workers can enjoy the full music experience without being subjected to loud or energetic sounds.

Other features will be understood with reference to the drawings. While various embodiments of the method and apparatus have been described above, it should be understood that they have been presented by way of example only, and not of limitation. Likewise, the various diagrams might depict an example of an architectural or other configuration for the disclosed method and apparatus, which is done to aid in understanding the features and functionality that might be included in the method and apparatus. The disclosed method and apparatus is not restricted to the illustrated example architectures or configurations, but the desired features might be implemented using a variety of alternative architectures and configurations. Indeed, it will be apparent to one of skill in the art how alternative functional, logical or physical partitioning and configurations might be implemented to implement the desired features of the disclosed method and apparatus. Also, a multitude of different constituent module names other than those depicted herein might be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

Applicant hereby incorporates each of claims 1 through 15 that were originally filed with the specification as if fully set forth herein.

I claim:

1. An apparatus comprising:

a cylindrical housing with a flange;

a motor defined by (1) a wire coil positioned around the inside of the housing; and (2) a magnet coaxially positioned within the wire coil;

a disk with at least one spoke extending between a center of the disk and a periphery of the disk; and, a source of a controlled electrical audio signal electrically coupled to the wire coil;

wherein the center of the disk is mechanically coupled to the magnet;

wherein the periphery of the disk is mechanically connected to the housing;

wherein the spoke is configured to flex between the center and periphery of the disk when the magnet moves relative to the wire coil;

wherein providing the electrical audio signal through the coil moves the magnet; and, whereby movement of the spoke does not push air into a substantially audible sound wave but instead may be felt as vibrational energy.

2. The apparatus of claim 1 wherein the spoke features a swerve.

3. The apparatus of claim 2 wherein the magnet is a ferrite magnet.

4. The apparatus of claim 2 wherein the magnet is a rare metal magnet.

5. The apparatus of claim 1 wherein vibrating the spoke results in vibration of the housing.

6. The apparatus of claim 5 where the flange is configured for securement to a structure.

7. The apparatus of claim 6 wherein the structure is the underside of a dance floor or stage.

8. The apparatus of claim 6 wherein the structure is a sidewalk.

9. The apparatus of claim 6 where the structure is a walkway.

10. A method of communicating vibrational energy to a human recipient comprising the steps of:

sending a controlled electrical audio signal to a motor that vibrates on a disk contained in a housing to generate vibrational energy that is substantially sub-audible; and, mechanically transmitting said vibrational energy to a human recipient via a structure in contact with the recipient;

wherein the motor is defined by a magnet disposed in a wire coil, and the magnet is mechanically coupled to spokes; and wherein providing the audio signal to the motor is accomplished by providing the electrical audio signal to the wire coil.

11. The method of claim 10 wherein the magnet is a ferrite magnet.

12. The method of claim 11 where the structure is the underside of a dance floor.

13. The method of claim 10 wherein the step of mechanically transmitting the vibrational energy to the human recipient is accomplished via mechanically coupling the disk to a housing, mechanically coupling the housing to a structure, and wherein the recipient receives the vibrational energy from the structure.

* * * * *